US012688421B1

(12) United States Patent
Hubara et al.

(10) Patent No.: US 12,688,421 B1
(45) Date of Patent: Jul. 21, 2026

(54) ACCELERATED SPARSE NEURAL NETWORK TRAINING USING TRANSPOSABLE PRUNING MASKS

(71) Applicant: HABANA LABS LTD., Caesarea (IL)

(72) Inventors: Itay Hubara, Jerusalem (IL); Chen Koren, Hadera (IL); Brian Chmiel, Nesher (IL); Moshe Island, Tel Mond (IL); Ron Banner, Yoqneam Illit (IL)

(73) Assignee: Intel Overseas Funding Corporation, Chandler, AZ (US)

( * ) Notice: Subject to any disclaimer, the term of this patent is extended or adjusted under 35 U.S.C. 154(b) by 1071 days.

(21) Appl. No.: 17/508,999

(22) Filed: Oct. 24, 2021

Related U.S. Application Data

(60) Provisional application No. 63/155,323, filed on Mar. 2, 2021.

(51) Int. Cl.
| | |
|---|---|
| *G06N 3/082* | (2023.01) |
| *G06F 7/523* | (2006.01) |
| *G06F 7/78* | (2006.01) |

(52) U.S. Cl.
CPC ............. *G06N 3/082* (2013.01); *G06F 7/523* (2013.01); *G06F 7/78* (2013.01)

(58) Field of Classification Search
CPC ........... G06N 3/082; G06F 7/523; G06F 7/78
See application file for complete search history.

(56) References Cited

U.S. PATENT DOCUMENTS

| | | | |
|---|---|---|---|
| 2016/0217368 A1 | 7/2016 | Ioffe et al. | |
| 2017/0286830 A1* | 10/2017 | El-Yaniv | G06N 3/045 |
| 2019/0188567 A1* | 6/2019 | Yao | G06N 3/08 |
| 2021/0182683 A1* | 6/2021 | Dai | G06N 3/045 |

(Continued)

FOREIGN PATENT DOCUMENTS

| | | | | |
|---|---|---|---|---|
| CN | 112418424 A | * | 2/2021 | G06N 3/04 |
| CN | 112884149 A | * | 6/2021 | G06N 3/045 |

(Continued)

OTHER PUBLICATIONS

Torsten Hoefler, Sparsity in Deep Learning: Pruning and growth for efficient inference and training in neural networks, Jan. 31, 2021 (Year: 2021).*

(Continued)

*Primary Examiner* — Hassan Mrabi

(74) *Attorney, Agent, or Firm* — Akona IP PC

(57) ABSTRACT

A method includes receiving a trained deep neural network (DNN) having multiple layers represented by respective weight matrices. The DNN is pruned by, for at least one layer represented by a respective weight matrix including multiple weights, converting the weight matrix into a structured sparse weight matrix by (a) defining multiple M-element line-blocks in the weight matrix, each line-block including the weights along an M-element portion of a row of the weight matrix, and respective multiple M-element column-blocks in a transpose of the weight matrix (b) specifying a subset of at least N weights in the weight matrix that are to be nulled in each M-element line-block and respective at least N weights to be nulled in each M-element column-block of the transpose of the weight matrix, and (c) nulling the weights in the subset. A deep learning operation is performed using the pruned DNN.

28 Claims, 4 Drawing Sheets

(56)            References Cited

U.S. PATENT DOCUMENTS

| 2021/0397963 A1* | 12/2021 | Jiang | G06N 3/082 |
| 2022/0103823 A1* | 3/2022 | Jiang | H04N 19/587 |
| 2023/0056315 A1* | 2/2023 | Wang | G06N 3/082 |

FOREIGN PATENT DOCUMENTS

| CN | 113361698 A | * | 9/2021 | G06N 3/045 |
| CN | 113383310 A | * | 9/2021 | G06F 12/0215 |
| CN | 114402596 A | * | 4/2022 | G06N 3/02 |

OTHER PUBLICATIONS

Ahuja et al., "Network Flows: Theory, Algorithms, and Applications", Chapter 9, Minimum Cost Flows: Basic Algorithms, Prentice-Hall, Inc., pp. 294-343, year 1993.

Banner et al., "Scalable Methods for 8-Bit Training of Neural Networks", Proceedings of Neural Information Processing Systems Conference (NeurIPS) 2018, pp. 1-9, year 2018.

Banner et al., "Post-Training 4-Bit Quantization of Convolutional Networks for Rapid-Deployment", Proceedings of 33rd Conference on Neural Information Processing Systems (NeurIPS 2019), pp. 1-9, year 2019.

Bellec et al., "Deep Rewiring: Training Very Sparse Deep Networks", Conference paper, ICLR 2018, pp. 1-24, Aug. 7, 2018.

Bengio et al., "Estimating or Propagating Gradients Through Stochastic Neurons for Conditional Computation", arXiv:1308.3432, pp. 1-12, Aug. 15, 2013.

Brown et al., "Language Models are Few-Shot Learners", arXiv:2005.14165 pp. 1-75, Jul. 22, 2020.

Dettmers et al., "Sparse Networks from Scratch: Faster Training without Losing Performance", arXiv:1907.04840, pp. 1-14, Aug. 23, 2019.

Evci et al., "Rigging the Lottery: Making All Tickets Winners", Proceedings of the 37th International Conference on Machine Learning, pp. 1-11, year 2020.

Fedus et al., "Switch Transformers: Scaling to Trillion Parameter Models with Simple and Efficient Sparsity", arXiv:/2101.03961, pp. 1-31, Jan. 11, 2021.

Finkelstein et al., "Fighting Quantization Bias with Bias", arXiv:1906.03193, pp. 1-9, Jun. 7, 2019.

Frankle et al., "The Lottery Ticket Hypothesis: Finding Sparse, Trainable Neural Networks", Conference Paper, International Conference on Learning Representations (ICLR) 2019, pp. 1-42, year 2019.

Gray et al., "GPU Kernels for Block-Sparse Weights", github.com, pp. 1-12, year 2017.

Han et al., "Learning both Weights and Connections for Efficient Neural Networks", arXiv:1506.02626, pp. 1-9, Oct. 30, 2015.

He et al., "Deep Residual Learning for Image Recognition", IEEE Conference on Computer Vision and Pattern Recognition (CVPR), Open Access Version, pp. 770-778, year 2016.

Hinton et al., "Distilling the Knowledge in a Neural Network", arXiv:1503.02531, pp. 1-9, Mar. 3, 2015.

Hubara et al., "Quantized Neural Networks: Training Neural Networks with Low Precision Weights and Activations", The Journal of Machine Learning Research, vol. 18, pp. 1-30, Jan. 2018.

Hubara et al., "Improving Post Training Neural Quantization: Layer-Wise Calibration and Integer Programming", arXiv:2006.10518, pp. 1-15, Dec. 14, 2020.

Janowsky, "Pruning versus Clipping in Neural Networks," Physical Review A, vol. 39, No. 12, pp. 6600-6603, Jun. 15, 1989.

Karnin, "A Simple Procedure for Pruning Back-Propagation Trained Neural Networks", IEEE Transactions on Neural Networks, vol. 1, No. 2, pp. 239-242, Jun. 1990.

Lee et al., SNIP: Single-Shot Network Pruning Based on Connection Sensitivity, Conference Paper, International Conference on Learning Representations (ICLR) 2019, arXiv:1810.02340, pp. 1-15, Feb. 23, 2019.

Li et al., Pruning Filters for Efficient ConvNets, Conference Paper, International Conference on Learning Representations (ICLR) 2017, arXiv:1608.08710, pp. 1-13, Mar. 10, 2017.

Liu et al., "Rethinking the Value of Network Pruning", Conference paper, ICLR 2019, pp. 1-21, Mar. 5, 2019.

Louizos at al., "Learning Sparse Neural Networks Through L0 Regularization", Conference Paper, International Conference on Learning Representations (ICLR) 2018, arXiv:1712.01312 pp. 1-13, Jun. 22, 2018.

Luo et al., "ThiNet: A Filter Level Pruning Method for Deep Neural Network Compression", Proceedings of IEEE International Conference on Computer Vision (ICCV), Open Access Version, pp. 5058-5066, year 2017.

Marcel et al., "Torchvision the Machine-Vision Package of Torch", Proceedings of the 18th ACM International conference on Multimedia (MM'10), pp. 1485-1488, year 2010.

Mocanu et al., "Scalable Training of Artificial Neural Networks with Adaptive Sparse Connectivity Inspired by Network Science", Nature Communications, vol. 9, pp. 1-12, year 2018.

Mostafa et al., "Parameter Efficient Training of Deep Convolutional Neural Networks by Dynamic Sparse Reparameterization", Proceedings of 36th International Conference on Machine Learning, pp. 1-10, year 2019.

Mozer et al., "Skeletonization: A Technique for Trimming the Fat from a Network via Relevance Assessment", Advances in Neural Information Processing Systems, pp. 107-115, year 1989.

Mozer et al., "Using Relevance to Reduce Network Size Automatically", Connection Science, vol. 1, No. 1, pp. 3-16, Jan. 1, 1989.

Nagel et al., "Up or down? Adaptive Rounding for Post-Training Quantization", Proceedings of 37th International Conference on Machine Learning (ICML), arXiv:2004.10568, pp. 1-12, Jun. 30, 2020.

Nahshan et al., "Loss Aware Post-Training Quantization", arXiv:1911.07190, pp. 1-20, Mar. 16, 2020.

Nvidia, "Nvidia Deep Learning Examples for Tensor Cores", GitHub, pp. 1-5, year 2021, as downloaded from https://github.com/NVIDIA/DeepLearningExamples.

Nvidia, "Nvidia A100 Tensor Core GPU Architecture", pp. 1-82, year 2020, as downloaded from https://images.nvidia.com/aem-dam/en-zz/Solutions/data-center/nvidia-ampere-architecture-whitepaper.pdf.

Renda et al., "Comparing Rewinding and Fine-Tuning in Neural Nework Pruning", Conference Paper, International Conference on Learning Representations (ICLR) 2020, pp. 1-31, year 2020.

Tan et al., "MnasNet: Platform-Aware Neural Architecture Search for Mobile", Proceedings of the IEE/CVF Conference on Computer Vision and Pattern Recognition, Open Access Version, pp. 2820-2828, year 2019.

Wen et al., "Learning Structured Sparsity in Deep Neural Networks", Conference Paper, 30th Conference on Neural Information Processing Systems (NIPS) 2016, pp. 1-9, year 2016.

Wu et al., "FBNet: Hardware-Aware Efficient ConvNet Design via Differentiable Neural Architecture Search", Proceedings of the IEEE/CVF Conference on Computer Vision and Pattern Recognition, Open Access Version, pp. 10734-10742, year 2019.

Zhou et al., "Learning N:M Fine-Grained Structured Sparse Neural Networks from Scratch", Conference Paper, International Conference on Learning Representations (ICLR) 2021, arXiv:2102.04010, pp. 1-15, Apr. 18, 2021.

Choi et al., "Data-free Network Quantization with Adversarial Knowledge Distillation," arXiv:2005.04136v1, pp. 1-11, May 8, 2020.

U.S. Appl. No. 18/353,128 Office Action dated Aug. 22, 2024.

U.S. Appl. No. 17/088,625 Office Action dated Jun. 4, 2024.

* cited by examiner

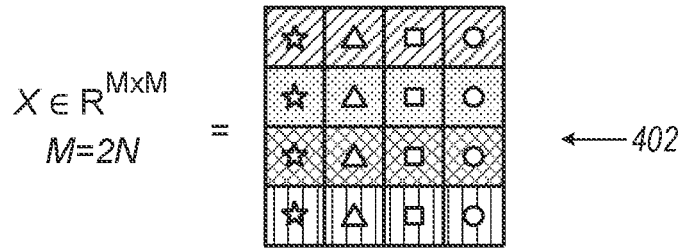
$X \in R^{MxM}$
$M=2N$
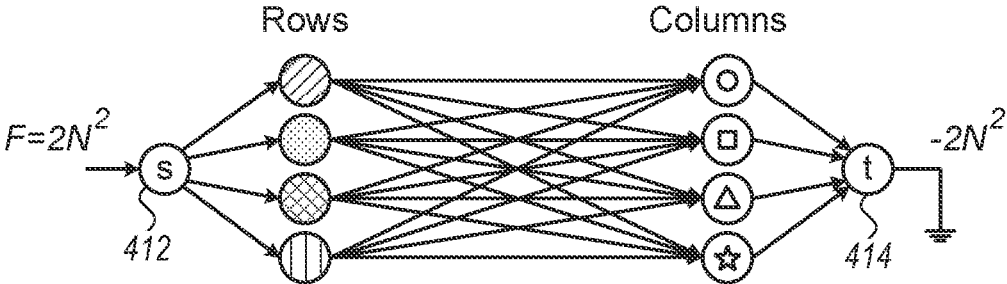
← 402
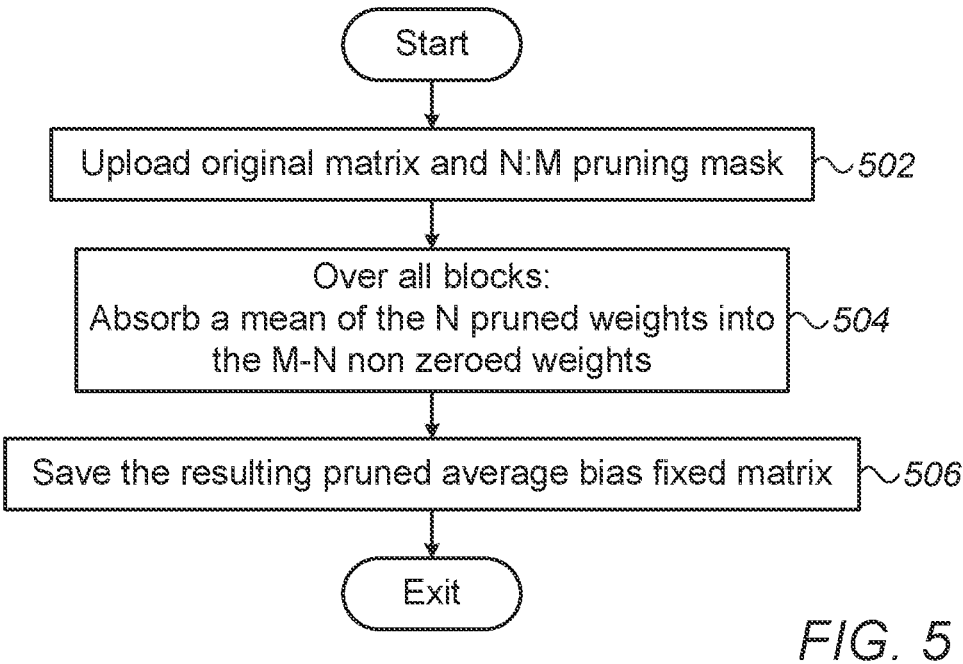
FIG. 4
Start
Upload original matrix and N:M pruning mask ~502
Over all blocks:
Absorb a mean of the N pruned weights into ~504
the M-N non zeroed weights
Save the resulting pruned average bias fixed matrix ~506
Exit
FIG. 5

ACCELERATED SPARSE NEURAL NETWORK TRAINING USING TRANSPOSABLE PRUNING MASKS

CROSS-REFERENCE TO RELATED APPLICATIONS

This application claims the benefit of U.S. Provisional Patent Application 63/155,323, filed Mar. 2, 2021, whose disclosure is incorporated herein by reference

FIELD OF THE INVENTION

The present invention relates generally to deep learning, and particularly to acceleration of training and/or inference run times of neural network models.

BACKGROUND OF THE INVENTION

Algorithmic methods to accelerate run times of a neural network model were previously proposed. For example, in a paper titled "Learning n:m fine-grained structures sparse neural networks from scratch," International Conference on Learning Representations (ICLR), May 2021, Zhou, A. et al. describe training from scratch an N:M fine-grained structured sparse network, which can maintain the advantages of both unstructured fine-grained sparsity and structured coarse-grained sparsity simultaneously on specifically designed GPUs. Specifically, a 2:4 sparse network could achieve 2× speed-up without performance drop on Nvidia A100 GPUs. The authors proposed a novel and effective ingredient, sparse-refined straight through estimator (SR-STE), to alleviate the negative influence of the approximated gradients computed by vanilla STE during optimization. We also define a metric, Sparse Architecture Divergence (SAD), to measure the sparse network's topology change during the training process. Finally, the authors justified SR-STE's advantages with SAD and demonstrate the effectiveness of SR-STE by performing experiments on various tasks.

Computation hardware to support accelerated run times of a neural network model were also previously discussed in the patent literature. For example, U.S. Pat. No. 10,180,928 describes Heterogeneous hardware accelerator architectures for processing sparse matrix data having skewed non-zero distributions. An accelerator includes sparse tiles to access data from a first memory over a high bandwidth interface and very/hyper sparse tiles to randomly access data from a second memory over a low-latency interface. The accelerator determines that one or more computational tasks involving a matrix are to be performed, partitions the matrix into a first plurality of blocks that includes one or more sparse sections of the matrix, and a second plurality of blocks that includes sections of the matrix that are very- or hyper-sparse. The accelerator causes the sparse tile(s) to perform one or more matrix operations for the computational task(s) using the first plurality of blocks and further causes the very/hyper sparse tile(s) to perform the one or more matrix operations for the computational task(s) using the second plurality of blocks.

SUMMARY OF THE INVENTION

An embodiment of the present invention that is described hereinafter provides a method including receiving a trained deep neural network (DNN) having multiple layers represented by respective weight matrices. The DNN is pruned by, for at least one layer represented by a respective weight matrix including multiple weights, converting the weight matrix into a structured sparse weight matrix by (i) defining in the weight matrix multiple line-blocks, each line-block including the weights along a portion of a row of the weight matrix, (ii) in each line-block, nulling a predefined subset of the weights while preserving a mean of the weights of the line-block, and (iii) performing a matrix multiplication in the DNN using the structured sparse weight matrix.

In some embodiments, the method further includes generating, from the structured sparse weight matrix, a lower-dimension weight matrix having the nulled weights removed. The matrix multiplication is performed using the lower-dimension weight matrix.

In an embodiment, a given line block has at least eight weights of which at least four are nulled.

In another embodiment, in a given line-block, at least half of the weights are nulled.

In some embodiments, the method further includes training the DNN.

There is additionally provided, in accordance with another embodiment of the present invention, a method, including receiving a trained deep neural network (DNN) having multiple layers represented by respective weight matrices. The DNN is pruned by, for at least one layer represented by a respective weight matrix including multiple weight (a) finding an optimal pruning mask that (i) specifies a respective subset of the weights in the weight matrix that are to be nulled, (ii) meets a predefined pruning ratio, and (iii) optimizes a predefined norm, and (b) nulling the subset of the weights specified in the optimal pruning mask. A matrix multiplication is performed in the DNN using the structured sparse weight matrix.

In some embodiments the method further includes generating, from the structured sparse weight matrix, a lower-dimension weight matrix having the nulled weights removed, and performing the deep learning operation is performed using the lower-dimension weight matrix. In an embodiment, a given line block has at least eight weights of which at least four are nulled. In another embodiment, in a given line-block, at least half of the weights are nulled. In an embodiment the method further includes training the DNN.

There is further provided, in accordance with another embodiment of the present invention, a method including receiving a trained deep neural network (DNN) having multiple layers represented by respective weight matrices. The DNN is pruned by, for at least one layer represented by a respective weight matrix including multiple weights, converting the weight matrix into a structured sparse weight matrix by (a) defining multiple M-element line-blocks in the weight matrix, each line-block including the weights along an M-element portion of a row of the weight matrix, (b) defining multiple M-element column-blocks in a transpose of the weight matrix, each column-block including the weights along an M-element portion of a column of the transpose of the weight matrix, (c) specifying a subset of the weights in the weight matrix that are to be nulled, such that (i) at least N weights in each M-element line-block of the weight matrix are to be nulled, and (ii) at least N weights in each M-element column-block of the transpose of the weight matrix are to be nulled, and (d) nulling the weights in the subset. A deep learning operation is performed using the pruned DNN.

In some embodiments, the method further includes generating, from the structured sparse weight matrix, a lower-dimension weight matrix having the nulled weights removed, and performing the deep learning operation is performed using the lower-dimension weight matrix. In an embodiment, a given line block has at least eight weights of which at least four are nulled. In an example embodiment, in a given line-block, at least half of the weights are nulled.

There is furthermore provided, in accordance with yet another embodiment of the present invention an apparatus including a memory and a processor. The memory is configured to store a trained deep neural network (DNN) having multiple layers represented by respective weight matrices. The processor is configured to (a) prune the DNN by, for at least one layer represented by a respective weight matrix including multiple weights, converting the weight matrix into a structured sparse weight matrix by (i) defining in the weight matrix multiple line-blocks, each line-block including the weights along a portion of a row of the weight matrix, (ii) in each line-block, nulling a predefined subset of the weights while preserving a mean of the weights of the line-block, and (iii) performing a matrix multiplication in the DNN using the structured sparse weight matrix.

There is further provided, in accordance with yet another embodiment of the present invention an apparatus including a memory and a processor. The memory configured to store a trained deep neural network (DNN) having multiple layers represented by respective weight matrices. The processor is configured to prune the DNN by, for at least one layer represented by a respective weight matrix including multiple weights (a) finding an optimal pruning mask that (i) specifies a respective subset of the weights in the weight matrix that are to be nulled, (ii) meets a predefined pruning ratio, and (iii) optimizes a predefined norm, and (b) nulling the subset of the weights specified in the optimal pruning mask, and (c) performing a matrix multiplication in the DNN using the structured sparse weight matrix.

There is additionally provided, in accordance with another embodiment of the present invention an apparatus including a memory and a processor. The memory is configured to store a trained deep neural network (DNN) having multiple layers represented by respective weight matrices. The processor is configured to prune the DNN by, for at least one layer represented by a respective weight matrix including multiple weights, converting the weight matrix into a structured sparse weight matrix by (a) defining multiple M-element line-blocks in the weight matrix, each line-block including the weights along an M-element portion of a row of the weight matrix, (b) defining multiple M-element column-blocks in a transpose of the weight matrix, each column-block including the weights along an M-element portion of a column of the transpose of the weight matrix, (c) specifying a subset of the weights in the weight matrix that are to be nulled, such that (i) at least N weights in each M-element line-block of the weight matrix are to be nulled, and (ii) at least N weights in each M-element column-block of the transpose of the weight matrix are to be nulled, and (d) nulling the weights in the subset. The processor is further configured to perform a deep learning operation using the pruned DNN.

The present invention will be more fully understood from the following detailed description of the embodiments thereof, taken together with the drawings in which:

BRIEF DESCRIPTION OF THE DRAWINGS

FIG. 4 is a diagram schematically showing a Minimal-Cost Flow (MCF) algorithm for generating an N:M=N:2N transposable structured sparse weights matrix, in accordance with an embodiment of the present invention;

FIG. 5 is a flow chart that schematically illustrates a method of performing a pruning bias fix for generating an N:M structured sparse weights matrix, in accordance with an embodiment of the present invention;

DETAILED DESCRIPTION OF EMBODIMENTS

Overview

Figure 1:
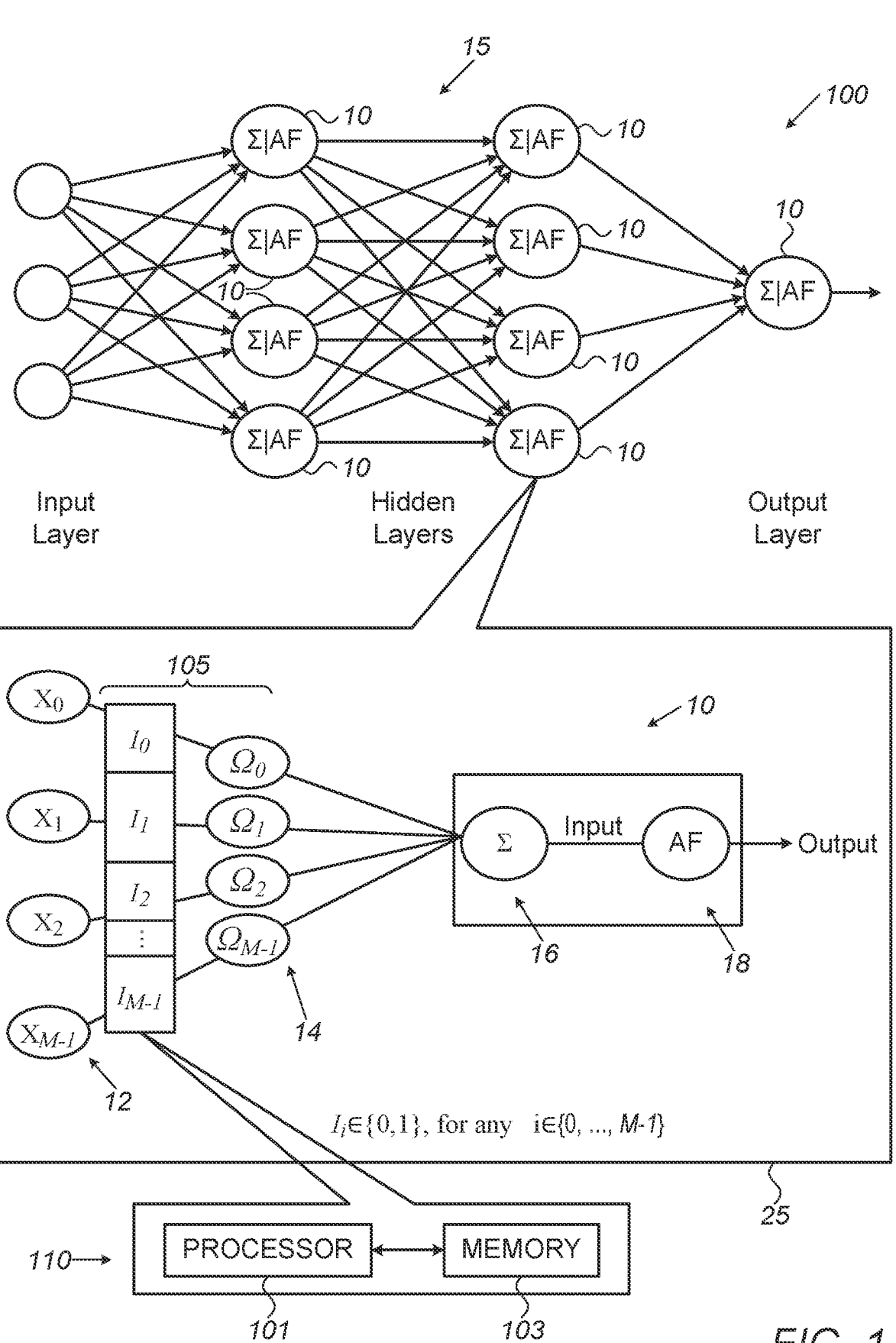
FIG. 1 is a schematic, pictorial block diagram of a deep neural network (DNN) and an apparatus configured to structurally prune the DNN, in accordance with an embodiment of the present invention.

Artificial Intelligence (AI) based computing tasks, such as deep learning calculations, may be performed using optimized computing systems. However, performing the tasks efficiently enough is an ongoing challenge, as deep neural networks (DNN) are typically very large.

Considering a typical DNN, the nodes of the DNN are arranged in layers comprising (i) an input layer (which receives input values for the DNN), (ii) an output layer (which produces output values of the DNN), (iii) and one or more intermediate layers (referred to as "hidden layers"). Typically, the size of a so called "dense" DNN largely depends on the number of nodes in the hidden layers.

One possible way of reducing the size of a dense DNN is to prune the DNN model. Pruning typically means zeroing a sub-set of weights that are used as inputs of nodes, thereby reducing the number of calculations per node. The motivation for pruning is based on the fact that DNNs often include unknown redundant portions. Therefore, it is expected that the accuracy of a DNN-based calculation can be largely maintained after pruning some of the weights of at least some of the layers of the dense DNN. Mathematically, pruning is often represented as zeroing a sub-set of weights in matrices of weights. Such matrices represent inputs to at least some of the layers of a dense DNN.

DNN pruning may involve unstructured pruning or structured pruning. In a typical unstructured pruning process, a pruning scheme is tested by solely attempting a global optimization of a DNN (e.g., based on a cost function or metric). Thus, unstructured pruning removes individual elements of the DNN, aiming for high total sparsity, while being agnostic to the locations of the pruned elements.

Most known DNN pruning methods focus on unstructured pruning, which reduces the memory footprint. However, current hardware implementations suggest that, unless very high sparsity levels (i.e., very deep pruning levels) are achieved, the model cannot be accelerated at all in such a way. Thus, alternatively to using pruning, the weights may be simply decompressed before multiplication.

Structured pruning, on the other hand, removes weights in specific location-based matrix patterns called hereinafter "N:M". For example, 1:2 structured pruning of an 8×8 weights matrix Ω will result in a checkerboard patterned matrix, W, with white squares representing weights that are zeroed.

In general, structured pruning, which removes weights in specific location-based patterns, may be more useful for hardware acceleration when they meet the so called "N:M sparsity constraint", or "pruning ratio." Hereinafter, a DNN is regarded as meeting an "N:M sparsity constraint" if, in each layer of the DNN, no more than N weights out of every M successive weights are non-zero. A particularly useful N:M sparsity constraint is a N:2N constraint, e.g., with N=2. Mathematically, N:M pruning is manifested as having at least N zeros in any given row of M successive elements (called also "line-block") which is fed into a matrix. In that regard, the terms "pruning a weight" or "nulling a weight" refers to setting a weight to zero or to a negligibly small value that is smaller than a threshold ε. For example, a 2:4 constraint means that, in every horizontal block of four elements which are fed into a matrix multiplier used in forward propagation in a DNN, at least two elements must be zeros.

As structured sparsity places non-zero elements at well-defined locations, this kind of constraint enables modern processors, e.g., CPUs and graphics processing units (GPUs), to easily exploit computational savings.

However, forcing structured sparsity on a DNN model, which was already trained without structured sparsity, may lead to severe accuracy degradation, as several bits of a pruning mask used to prune the model may change to satisfy the structured sparsity requirements. In the present context, the terms "pruning mask" or simply "mask" refer to a definition of which weights are to be pruned. A pruning-mask may be represented, for example, as an array of zeros and ones, typically a matrix of zeros and ones, such as a binary (0/1) form of the aforementioned checkerboard patterned matrix, to give one example. An element of the mask that is equal to zero indicates that the corresponding weight (e.g., the weight that appears in the same row/column location in the weight matrix) is to be pruned. A non-zero element of the mask indicates that the corresponding weight is not to be pruned.

Some embodiments of the present invention that are described hereinafter provide methods of converting unstructured pruning into an N:2N structured pruning that meets the N:2N sparsity constraint for any N≥2 (e.g., 2:4, 4:8, 8:16). In general, these techniques hold for N:M structured pruning for N≥2.

In one embodiment, called hereinafter "pruning bias fix," the disclosed a bias fix pruning algorithm and method involving absorbing a mean of the N pruned weights into the remaining N:2N non-zeroed weights, such that the mean of a line-block does not change due to pruning. As described below, this fix considerably boosts accuracy when performing a deep learning operation using the pruned DNN, such as performing inference and/or re-training.

In another embodiment, a per-layer algorithm, exemplified hereinafter by an algorithm called "AdaPrune," is used with a disclosed method that includes optimizing the weights and quantizing parameters of a matrix. See also the techniques described by Hubara et al. in the paper, "Improving post training neural quantization: Layer-wise calibration and integer programming," ArXiv, abs/2006.10518, 2020.

Using a small calibration data set, AdaPrune was found to reduce the pre-activation reconstruction error, as measured via mean squared-error per-layer. In some cases, AdaPrune was found to obtain less than 1% degradation from the original unstructured-sparse DNN model counterpart, when performing a deep learning operation using the pruned DNN, such as performing inference and/or re-training. Moreover, AdaPrune may be used to adapt any generic mask to suit the available hardware, thus reducing the need to retrain the model. In some example use-cases, when starting from a dense model (thus having 50% pattern violation for an N:2N sparsity constraint) using AdaPrune yielded 2.3% degradation.

Often, however, a pretrained model is not given. Some embodiments of the present invention that are described hereinafter provide a technique to perform training using structurally pruned weight matrices, by forcing an additional condition that such matrices are transposable, for reasons explained below.

In general, training DNNs typically requires three matrix multiplications per layer. The first multiplication is required for forward propagation between the weights and activation. The other two multiplications are used for backward and update phases. The backward phase calculates the gradients of the loss function with respect to the input of the neural layer. This is done by recursively passing the error from the last layer to the first. Note that the backward phase uses the transposed weights matrix. Hence, accelerating the backward phase requires the transposed weight matrix to adhere to the hardware-required pattern (e.g., N:2N structured sparsity).

To train a DNN efficiently, some embodiments that are described hereinafter present a novel transposable pruning algorithm and related method. The transposable pruning algorithm presents an N:M (e.g., an N:2N) transposable structured pruning mask I, where the same mask can be used to accelerate both forward and backward passes in DNN training. To this end, the required mask contains no more than N non-zero elements in any given line-block of 2N elements in I, and no more than N non-zero elements in any column-block of 2N elements in $I^T$. The transposable restriction forces the same N:2N constraint on 2N-element column blocks of a pruned weight matrix $W=(I\odot\Omega)^T$, as applied on 2N-element line-blocks of $I\odot\Omega$, wherein $\odot$ denotes element-by-element multiplication.

This disclosure formulates the problem and suggests two methods to generate the transposable pruning mask: the first trains from a dense model using a min-cost flow procedure, and the second trains from scratch, using an approximation algorithm that allows a more efficient training.

The above disclosed structured pruning techniques may enable highly efficient training and/or inference under a hardware N:2N sparsity constraint, while maintaining accuracy of the DNN models.

System Description

FIG. 1 is a schematic, pictorial block diagram of a deep neural network (DNN) 100, and an apparatus 110 configured to structurally prune DNN 100, in accordance with an embodiment of the present invention. Apparatus 100 comprises a processor 101, and a memory 103 that stores the disclosed pruning algorithms. Memory 103 may also store the various matrices of the DNN, before, during and after pruning.

In various embodiments, DNN 100 may be implemented in hardware, e.g., in a hardware accelerator comprising one or more Application-Specific Integrated Circuits (ASICs) or Field-Programmable Gate Arrays (FPGAs), in software running on a suitable processor, such as processor 101, or using a combination of hardware and software.

DNN 100 shown in FIG. 1 is a simplified deep neural network brought purely for clarity and simplicity of presentation. As seen at the top of the figure, DNN 100 comprises multiple nodes 10. Nodes 10 are arranged in layers, in the present example comprising an input layer (which receives input values for the DNN), an output layer (which produces output values of the DNN) and one or more intermediate layers (referred to as "hidden layers").

Each node 10 is connected to other nodes in an inter hidden layer connectivity scheme 15, allowing signals to pass, e.g., during inference or during training, in a forward direction through the network from input to output layers through the hidden intermediate layers.

Simplified DNN 100 comprises hidden layers having a same number of nodes 10 (e.g., a number M with M=128, 256 or 512). In general, the size of each hidden layer may be different than it neighboring layers, resulting in an inter hidden layer connectivity scheme that is described by a rectangular matrix. In the case of simplified DNN 100, inter hidden layer connectivity scheme 15 can be described by a square matrix, such a square matrix of weights.

Inference of DNN 100 includes performing forward propagation, which is the process of multiplying the various input values of a particular node 10 by associated weights, summing the results, and non-linearly scaling the output values using an activation function (AF), to fall in a predetermined range. The signals are then passed on to the next layer of nodes.

Forward propagation performed by an example node 10 is illustrated in an inset 25, where the input to a given AF 18 is a sum 16 of products of inputs $\{X_k\}$ 12 by their corresponding weights $\{\Omega_k\}$ 14. When a layer is batch-normalized, the layer's vector $\{X_k\}$ 12 has a zero mean value and a unity standard deviation (STDEV). The required computation effort for forward and/or backward propagation is determined in part by the size of $\{\Omega_k\}$ 14, which can be large (e.g., M=512).

In the process, a normalized output of a previous layer is fed as an input (i.e., $\{X_k\}$ 12) to the next layer of nodes 10. This, in turn, affects the weighted input value sums of the following layers of DNN 100, and so on, which then affects the computation of new weights and their distribution backward through the network. Ultimately, the above-described process affects the final output value(s) of DNN 100.

As further seen in inset 25, to reduce the size of inter hidden layer connectivity scheme 15, processor 101 performs structured pruning of weights $\{\Omega_k\}$ 14, by multiplying the array of weights $\{\Omega_k\}$ 14 with an array of binary elements $\{I_k\}$ 13. For a given k, $I_k$=0 or $I_k$=1, depending whether weight $\Omega_k$ of the given layer is to be pruned or not. The resulting array 105 is called hereinafter "sparse weights array."

Considering the full inter hidden layer connectivity scheme results in a set of pruned arrays of weights 105 called hereafter a "sparse weights matrix." Each column in the sparse weights matrix corresponds to a respective layer of DNN 100, and the elements of the column are the weights in the weight vector of that layer.

As noted above, pruning results in effectively smaller arrays, such as array of weights $\{\Omega_k\}$ 14, per layer (e.g., having one dimension of 256 instead of 512), which can greatly accelerate training time and/or inference time. To this end, some of the disclosed embodiments use hardware configured to run an N:2N structurally pruned DNN with N being a power of 2 (i.e., N=2, 4, 8, . . . ).

In some embodiments, some or all of the functions of DNN 100 and apparatus 110 may be implemented in a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Structured Pruning

Figure 2:
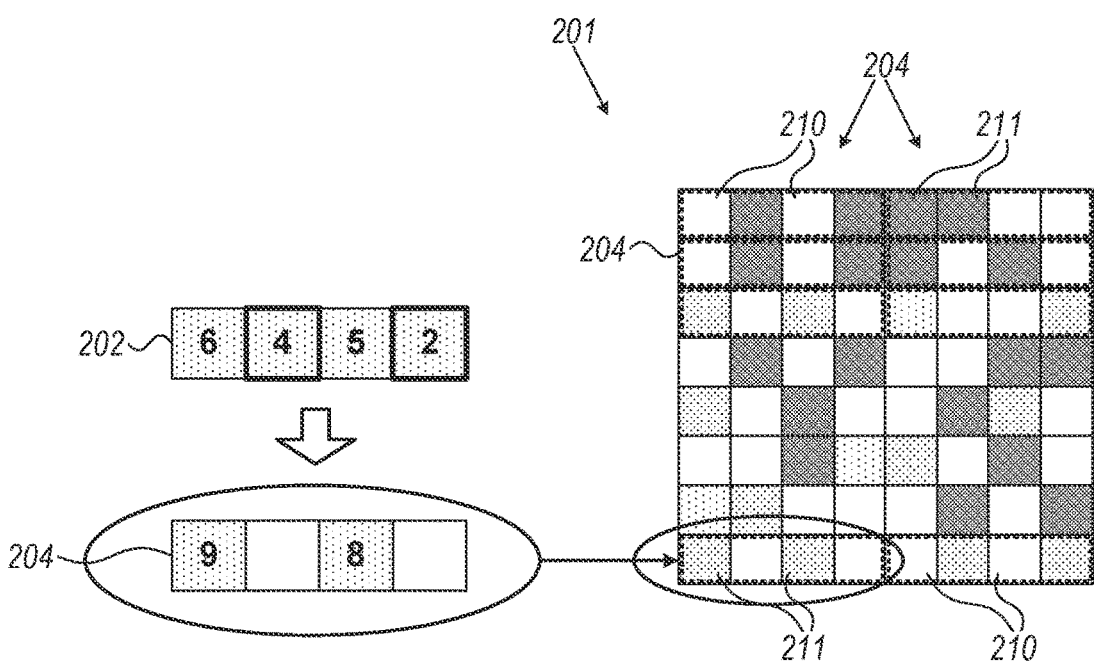
FIG. 2 is a diagram schematically showing a pruning bias fix process to structurally prune a given "dense" weight matrix, in accordance with an embodiment of the present invention.

FIG. 2 is a diagram schematically showing a pruning bias fix process to structurally prune a given "dense" weight matrix, in accordance with an embodiment of the present invention. The term "dense" means that the number of zeros in the matrix can be higher than in a respectively pruned matrix that is generated using the disclosed process. In the shown example, this process generates a 2:4 structured sparse weights matrix W 201.

To generate matrix 201, processer 101 generates multiple line-blocks 204 of the matrix 201. In the shown example, any predefined line-block 204 comprises a part of a row having four elements. Processor 101 generates each specific line-block 204 by applying a pruning bias fix process to a respective line-block 202 (which typically has no zeros within it) of the given "dense" weight matrix (full dense matrix not shown).

The example of FIG. 2 shows on the left, a bias fix process that generates a block 204 from a respective block 202 of the "dense" weight matrix. Processor 101 converts block 202 into block 204 by zeroing the smaller values "4" and "2" of block 202, and distributing their values among the two remaining weights. That way, the sum of the pruned weights (2+4=6 in this example) is evenly divided by processor 101 and added to the two remaining non-zero elements, 6→9 and 5→8. This "absorption" process of weights generates a 2:4 sparsity block 204 of the kind found in matrix 201. The term "absorbing the mean" means that, in a given block of matrix elements, the remaining non-zero elements are scaled so that the mean after pruning remains the same as the original mean before pruning.

It was found by the inventors, that using the disclosed "bias fix" process, the degradation in accuracy caused by pruning is reduced considerably.

The end result is a 2:4 structured sparse weights matrix 201 made of 2:4 structurally pruned line-blocks 204. For example, each framed 4-element line-block 204 in matrix 201 contains two zero elements 210 and two non-zero elements 211.

Thus, it can be said that Matrix 201 is obtained by "absorbing," in each 4-element line-block of an original matrix, the mean of the zeroed weights to the non-zeroed weights.

While the shown example is for generating 2:4 sparsity, the method holds generally for N:M sparsity and in particular to N:2N sparsity, such as 4:8.

In another embodiment, generating a per-layer structurally pruned weight matrix, I⊙Ω, comprises minimizing, over all possible pruning masks I'', a norm $\|\Omega X-(I''\odot\Omega)X\|$, such as the 12 norm, wherein it is the per-layer weight matrix from which the pruned weight matrix W is generated, X is an input matrix obtained from a previous layer (e.g., matrix including activation values), I is the pruning mask found in the norm-minimization, and ⊙ is an element-by-element product.

Accelerated Sparse Neural Training Using Transposable Pruning Masks

As noted above, some embodiments of the present invention present a novel N:2N transposable fine-grained sparse weights matrix W', where the same matrix can be used to accelerate both forward and backward passes in DNN training. In the context of this disclosure the term "fine-grain operation" means an operation performed at a line-block level of a matrix.

Figure 3:
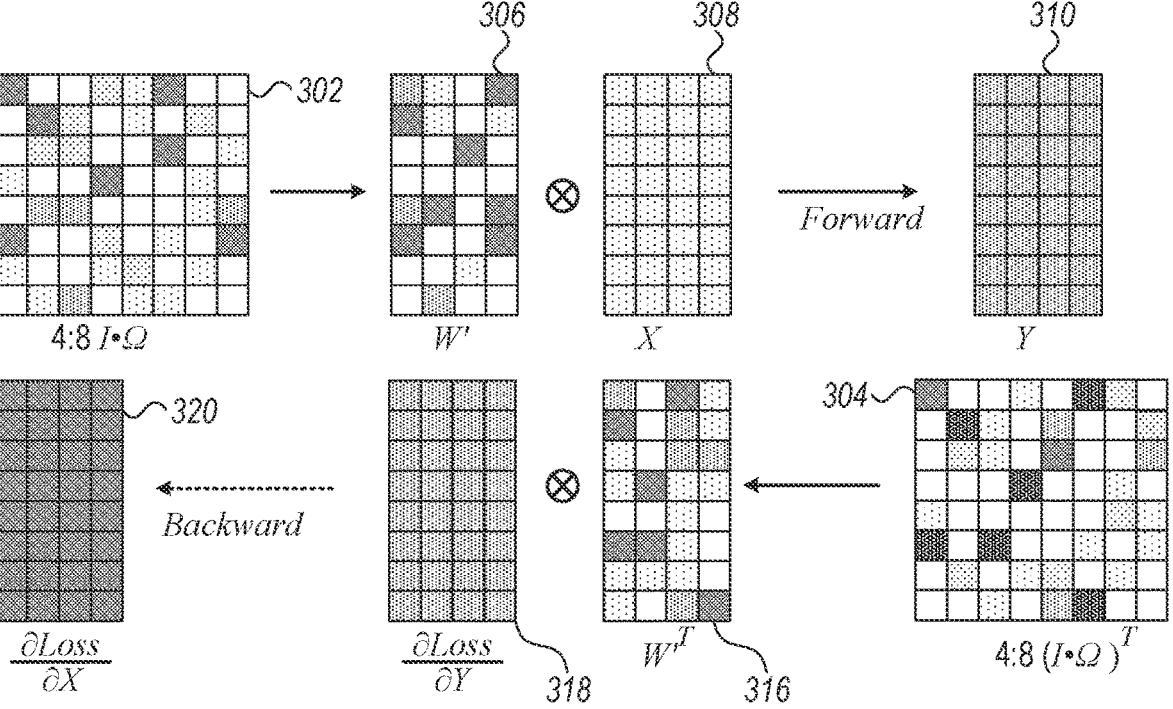
FIG. 3 is a diagram schematically showing use of a 4:8 structured sparse weights matrix and its transpose matrix, respectively, in forward and backward propagation in a DNN, in accordance with an embodiment of the present invention.

FIG. 3 is a diagram schematically showing use of a 4:8 structured sparse weights matrix $W=I\cdot\Omega$ 302 and its transpose matrix $(I\cdot\Omega)^T$ 304, respectively, in forward and backward propagation in a DNN, in accordance with an embodiment of the present invention.

Obtaining matrices 302 and 304 is described below in this section, starting with equations 1 and 2.

At the top of FIG. 3, in the forward stage, processor 101 obtains a pruned matrix 302 by applying a 4:8 transposable mask I to $\Omega$. Then, using hardware or software means, W is compressed into a lower size matrix W' 306. Next, the processor multiplies W' with an input matrix X, 308, (e.g., multiplies an array inputs $\{X_k\}$ 12 that is an output matrix of a previous layer), to obtain a new weighted matrix Y, 310, that serves as an input of a next DNN layer.

At the bottom of in FIG. 3, in the backward stage, the processor obtains $W^T$ 316 from the 4:8 structurally pruned $W^T=(I\cdot\Omega)^T$, 304 by hardware or software compression. Note, the dot symbol means element-by-element multiplication, the same as the $\odot$ symbol. Next, the processor multiplies $W'^T$ by a loss gradient matrix 318, to a weighted loss gradient matrix, 320, that is further adjusted by minimizing a loss metric of a previous layer, in an iterative way, until the DNN is fully trained.

To generate matrices W', 302 and $W'^T$, 304, this disclosure provides and solves an integer-programming (IP) formulation which finds an optimal transposable pruning mask. Considering a block of size M×M in a weight matrix $\Omega$, the goal is to maximize the $l_1$ norm of $\Omega$ after masking N elements in each row and column.

The problem is formulated herein as an integer program. Defined first is a binary indicator variable $I_{i,j}$, where $I_{i,j}=1$ if and only if the element $\Omega_{i,j}$ is part of the chosen pruning mask, otherwise $I_{i,j}=0$. The integer program is as follows:

Maximize $$\sum_{i,j=0}^{M-1} |\Omega_{i,j}| \cdot I_{i,j} \qquad \text{Eq. 1}$$

Such that $$\sum_j I_{i,j} = N, \quad \text{for any } i \in \{0, \dots, M-1\} \qquad \text{Eq. 2}$$

$$\sum_i I_{i,j} = N, \quad \text{for any } j \in \{0, \dots, M-1\}$$

$$I_{i,j} \in \{0, 1\}, \quad \text{for any } i, j \in \{0, \dots, M-1\}$$

$I_{i,j}$ is the above-mentioned pruning mask or structured pruning mask. An optimal method, in terms of accuracy, for solving the above problem and enforcing N:M transposable sparsity during training is the Minimal-Cost Flow (MCF) algorithm. The MCF algorithm solution should be used when training from a pretrained dense model where the transposable pruning mask is generated once and is then fixed during training. The MCF algorithm is a textbook solution that appears, for example, in "Network Flows: Theory, Algorithms, and Applications," Chapter 9 (MINIMUM COST FLOWS: BASIC ALGORITHMS, pages 294-343), Prentice-Hall, Inc. (1993) by RK Ahuja et. al.

FIG. 4 is a diagram schematically showing an MCF algorithm for generating an N:M=N:2N per-layer transposable structured sparse weights matrix 402, in accordance with an embodiment of the present invention.

As seen, in addition to a source and a sink, the network representing the algorithm has a node for each row and for each column. The construction uses three types of edges: (i) source edges emanating from the source node "s" 412 into each row node i; (ii) sink edges connecting each column node j with the sink node "t" 414; and (iii) a coefficient edge (i; j) for each matrix element $\Omega_{i,j}$. Each source edge (s; i) has capacity N which is equal to the number of elements that need to be selected for pruning in row i. Similarly, each sink edge (j; t) has capacity N which is equal to the number of elements pruned in column j. Each coefficient edge (i; j) has unit capacity and cost $|\Omega_{i,j}|$. Finally, selecting a matrix element with weight $\Omega_{i,j}$ for pruning corresponds to a unit flow on the coefficient edge (i; j). A min-cost flow from source "s" to destination "t" would find the lowest possible cost of sending a flow of value $2N^2$ from the source "s" to the destination "t". Assuming the source and sink edges have a zero cost, it is easy to see a one-to-one correspondence between a minimal cost flow in this construction and an optimal transposable mask that minimizes the sum of absolute values selected for pruning.

Sparse training from scratch, on the other hand, requires changing the mask during training. While MCF is suitable in principle, for practical use it is preferable to use a very efficient, even if less accurate, algorithm for computing the mask.

Methods of Structured Pruning

FIG. 5 is a flow chart that schematically illustrates a method of performing a pruning bias fix for generating an N:M structured sparse weights matrix, in accordance with an embodiment of the present invention. The method is exemplified in FIG. 2 for generating a 2:4 structured sparse weights matrix.

The algorithm, according to the present embodiment, carries out a process that begins with processor 101 uploading from memory 103 an original matrix to be pruned and a pruning mask, such as pruning mask $I_{i,j}$, at matrices uploading step 502. Next, over all weight matrix blocks of size M, such as defined in FIG. 2, processor 101 performs the pruning average bias fix, at a pruning bias fix step 504. In this step, the average of each of the blocks of the original matrix is absorbed by processor 101 into the non-zero element of the pruned matrix. Processor 101 saves the resulting matrix in memory 103, at a saving into memory step 506.

At this point the process ends.

The flow chart shown in FIG. 5 is brought purely by for clarity of presentation. For example, different computationally-efficient pruning bias fix steps may be realized for achieving the same goal.

Figure 6:
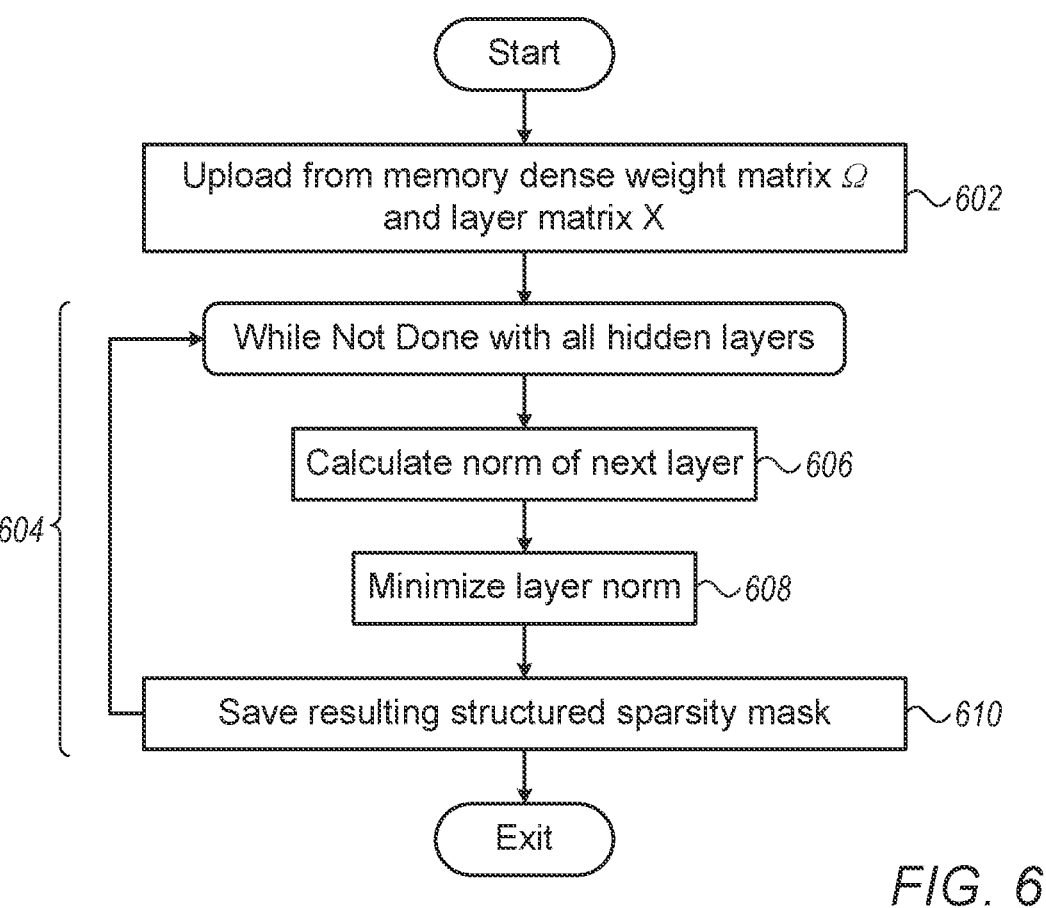
FIG. 6 is a flow chart that schematically illustrates a method of finding a pruning mask using "AdaPrune," in accordance with an embodiment of the present invention.

FIG. 6 is a flow chart that schematically illustrates a method of finding a pruning mask using "AdaPrune," in accordance with an embodiment of the present invention.

The algorithm, according to the present embodiment, carries out a process that begins with processor 101 uploading from memory 103 an original weight matrix W and the matrix X to be pruned at matrices uploading step 602.

Next, in an iterative forward propagation manner (604), the processor performs the following steps on each hidden layer:

The processor calculates parametrically the norm ‖WX–(I"⊙W)X‖, whose minimization would yield the required pruning mask I, in a norm calculation step 606.

At an "Adaprune" step 608, processor 101 minimizes the layer's norm using as inputs weights obtained from already norm-minimized previous layers, in a forward propagation manner. Processor 101 repeatedly saves the resulting structured pruning mask in memory 103, at a saving into memory step 610.

When norms of all hidden layers were minimized and thereby providing the minimizing weights, the pruning process ends.

The flow chart shown in FIG. 6 is brought purely by for clarity of presentation. For example, different minimizing norms can be used to achieve the same goal.

Method of Accelerated Sparse Neural Training Using Transposable Pruning Masks

Figure 7:
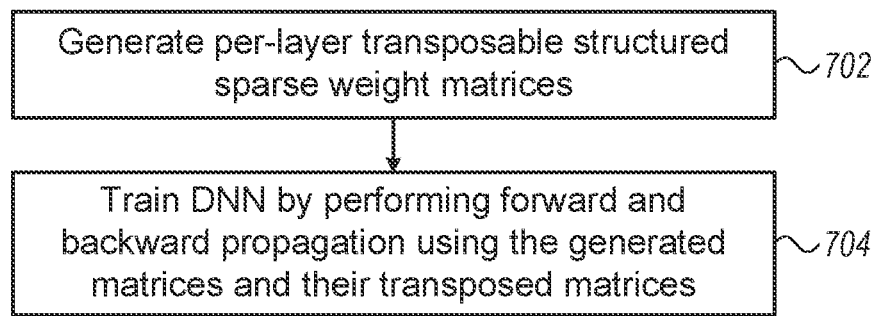
FIG. 7 is a flow chart that schematically illustrates a method of generating a N:M structured sparse weights matrix and its transpose matrix, and using these matrices in DNN training, in accordance with an embodiment of the present invention.

FIG. 7 is a flow chart that schematically illustrates a method of generating a N:M structured sparse weights matrix, such as matrix 302, its transposition of matrix 304, and using these matrices in DNN training, in accordance with an embodiment of the present invention.

The algorithm, according to the present embodiment, carries out a process that begins with processor 101 generating structured transposable sparse weights matrices (e.g., matrices such as I·Ω 302), as described in FIG. 4, at a transposable mask generation step 702.

As written above, a structured transposable sparse weights matrix is typically made per-layer selected for sparse training, as different layers may have different sizes and distribution of weights.

Next, processor 101 uses the structured transposable sparse weights matrix in forward propagation and the transposed matrix in backward propagation to train the DNN, at a DNN sparse training step 704.

Although the embodiments described herein mainly address deep learning, the methods and systems described herein can also be used in other applications.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

receiving a trained deep neural network (DNN) having multiple layers represented by respective weight matrices;

generating a pruned DNN by, for at least one layer represented by a weight matrix comprising multiple weights, converting the weight matrix into a structured sparse weight matrix by:

defining in the weight matrix multiple line-blocks, each line-block comprising the weights along a portion of a row of the weight matrix, and in each line-block, nulling a predefined subset of the weights while preserving a mean of the weights of the line-block by absorbing the mean of the predefined subset of the weights into remaining non-zero weights of the line-block, wherein each nulled weight is zero, wherein absorbing the mean of the predefined subset of the weights into the remaining non-zero weights of the line-block comprises increasing one or more absolute values of the remaining non-zero weights of the line-block based on the mean of the predefined subset of the weights; and performing an artificial intelligence task using the pruned DNN, wherein performing the artificial intelligence task comprises performing a matrix multiplication in the pruned DNN based on the structured sparse weight matrix.

2. The method according to claim 1, and comprising generating, from the structured sparse weight matrix, a lower-dimension weight matrix having the nulled weights removed, and wherein the matrix multiplication is performed using the lower-dimension weight matrix.

3. The method according to claim 1, wherein a given line-block has at least eight weights of which at least four are nulled.

4. The method according to claim 1, wherein, in a given line-block, at least half of the weights are nulled.

5. The method according to claim 1, further comprising training the DNN.

6. A method, comprising:

receiving a trained deep neural network (DNN) having multiple layers represented by respective weight matrices;

generating a pruned DNN by, for at least one layer represented by a weight matrix comprising multiple weights, converting the weight matrix into a structured sparse weight matrix:

finding an optimal pruning mask that (i) specifies a respective subset of the weights in the weight matrix that are to be nulled, (ii) meets a predefined pruning ratio by ensuring at least N weights out of every M successive weights are nulled, and (iii) optimizes a predefined norm, nulling the subset of the weights specified in the optimal pruning mask by changing a value of each weight in the subset to zero, and increasing one or more absolute values of one or more non-zero weights in the weight matrix based on the mean of the subset of the weights; and performing an artificial intelligence task using the pruned DNN, wherein performing the artificial intelligence task comprises performing a matrix multiplication in the pruned DNN using the structured sparse weight matrix.

7. The method according to claim 6, and comprising generating, from the structured sparse weight matrix, a lower-dimension weight trick weight matrix having the nulled weight removed, and wherein the matrix multiplication is performed using the lower-dimension weight matrix.

8. The method according to claim 6, wherein M is at least eight, and N is at least four.

9. The method according to claim 6, wherein N is at least half of M.

10. The method according to claim 6, further compromising training the DNN.

11. A method, comprising:

receiving a trained deep neural network (DNN) having multiple layers represented by respective weight matrices;

generating a pruned DNN by, for at least one layer represented by a weight matrix comprising multiple weights, converting the weight matrix into a structured sparse weight matrix by:

defining multiple M-element line-blocks in the weight matrix, each line-block comprising the weights along an M-element portion of a row of the weight matrix, defining multiple M-element column-blocks in a transpose of the weight matrix, each column-block comprising the weights along an M-element portion of the column of the transpose of the weight matrix, specifying a subset of the weights in the weight matrix that are to be nulled, such that (i) at least N weights in each M-element line-block of the weight matrix are to be nulled, and (ii) at least N weights in each M-element, column-block of the transpose of the weight matrix are to be nulled, nulling the weights in the subset by changing a value of each weight in the subset to zero, and increasing one or more absolute values of one or more non-zero weights in the weight matrix based on the mean of the subset of the weights; and performing a deep learning operation using the pruned DNN.

12. The method according to claim 11, and comprising generating, from the structured sparse weight matrix, a lower-dimension weight matrix having the nulled weights removed, and wherein the deep learning operation is performed using the lower-dimension weight matrix.

13. The method according to claim 11, wherein a given 40e-line-block has at least eight weights of which at least four are nulled.

14. The method according to claim 11, wherein, in a given line-block, at least half of the weights are nulled.

15. An apparatus, comprising:

a memory configured to store data of a trained deep neural network open (DNN) having multiple layers representative by respective weight matrices; and a processor configured to:

generate a pruned DNN by, for at least one layer represented by a weight matrix comprising multiple weights, converting the weight matrix into a structured sparse weight matrix by:

defining in the weight matrix multiple line-blocks, each line-block comprising the weights along a portion of a row of the weight matrix, and in each line-block, nulling a predefined subset of the weights while preserving a mean of the weights of the line-block by absorbing the mean of the predefined subset of the weights into remaining non-zero weights of the line-block, wherein each nulled weight is zero, wherein absorbing the mean of the predefined subset of the weights into the remaining non-zero weights of the line-block comprises increasing one or more absolute values of the remaining non-zero weights of the line-block based on the mean of the predefined subset of the weights, and perform an artificial intelligence task using the pruned DNN, wherein performing the artificial intelligence task comprises performing a matrix multiplication in a DNN using the structured sparse weight matrix.

16. The apparatus according to claim 15, wherein the processor is further configured to perform the artificial intelligence task by:

generating, from the structured sparse weight matrix, a lower-dimension weight matrix having the nulled weights removed; and to performing the matrix multiplication using the lower-dimension weight matrix.

17. The apparatus according to claim 15, wherein a given line-block has at least eight weights of which at least four or nulled.

18. The apparatus according to claim 15, wherein, in a given line-block, at least half of the weights are nulled.

19. The apparatus according to claim 15, wherein the processor is further configured to train the DNN.

20. An apparatus, comprising:

a memory configured to store data of a trained deep neural network (DNN) having multiple layers represented by respective weight matrices; and a processor, which is configured to:

generate a pruned DNN by, for at least one layer represented by a weight matrix comprising multiple weights, converting the weight matrix into a structured sparse weight matrix by:

finding an optimal pruning mask that (i) specifies a respective subset of the weights in the weight matrix that are being nulled, (ii) meets a predefined pruning ratio by ensuring at least N weights out of every M successive weights are nulled, and (iii) optimizes a predefined norm, nulling the subset of the weights specified in the optimal pruning mask by changing a value of each weight in the subset to zero, and increasing one or more absolute values of one or more non-zero weights in the weight matrix based on the mean of the subset of the weights, and perform an artificial intelligence task using the pruned DNN, wherein performing the artificial intelligence task comprises performing a matrix multiplication in the DNN using the structured sparse weight matrix.

21. The apparatus according to claim 20, wherein the processor is further configured to perform the artificial intelligence task by:

generating, from the structured sparse weight matrix, a lower-dimension weight matrix having the nulled weights removed; and performing the matrix multiplication using the lower-dimension great matrix.

22. The apparatus according to claim 20, wherein M is at least eight, and N is at least four.

23. The apparatus according to claim 20, wherein N at least half of M.

24. The apparatus according to claim 20, wherein the processor is further configured to train the DNN.

25. An apparatus, comprising:

a memory configured to store data of a trained deep neural network (DNN) having multiple layers represented by respective weight matrices; and a processor, which is configured to:

generate a pruned DNN by, for at least one layer represented by a weight matrix comprising multiple weights, converting the weight matrix into a structured sparse weight matrix by:

defining multiple M-element line-blocks in the weight matrix, each line-block comprising the weights along an M-element portion of a row of the weight matrix, defining multiple M-element column-blocks in a transpose of the weight matrix, each column-block comprising the weights along an M-element portion of a column of the transpose of the weight matrix, specifying a subset of the weights in the weight matrix that are to be nulled, such that (i) at least N weights in each M-element line-block of the weight matrix are to be nulled, and (ii) at least N weights in each M-element column-block of the transpose of the weight matrix are to be nulled, nulling the weights in the subset by changing a value of each weight in the subset to zero, and increasing one or more absolute values of one or more non-zero weights in the weight matrix based on the mean of the subset of the weights, and perform a deep learning operation using the pruned DNN.

26. The apparatus according to claim 25, where in the processor is further configured to perform the deep learning operation by:

generating, from the structured sparse weight matrix, a lower-dimension weight matrix having the nulled weights removed; and performing the deep learning operation using the low-dimension weight matrix.

27. The apparatus according to claim 25, wherein a given line-block has at least eight weights of which at least four are nulled.

28. The apparatus according to claim 25, wherein, in a given line-block, at least half of the weights are nulled.

* * * * *